(12) United States Patent  (10) Patent No.: US 7,324,313 B2
Childress et al.  (45) Date of Patent: Jan. 29, 2008

(54) READ SENSOR HAVING AN IN-STACK BIASING STRUCTURE AND AN AP COUPLED FREE LAYER STRUCTURE FOR INCREASED MAGNETIC STABILITY

(75) Inventors: Jeffrey Robinson Childress, San Jose, CA (US); Robert E. Fontana, Jr., San Jose, CA (US); Kuok San Ho, Santa Clara, CA (US); Ching Hwa Tsang, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 429 days.

(21) Appl. No.: 10/955,681

(22) Filed: Sep. 30, 2004

(65) Prior Publication Data

US 2006/0067016 A1 Mar. 30, 2006

(51) Int. Cl.
*G11B 5/127* (2006.01)
(52) U.S. Cl. ................................. 360/324.12
(58) Field of Classification Search ........... 360/324.12, 360/324.11, 324.1, 314, 324; 29/603.08
See application file for complete search history.

(56) References Cited

U.S. PATENT DOCUMENTS

| | | |
|---|---|---|
| 6,271,997 B1 | 8/2001 | Gill |
| 6,430,014 B1 * | 8/2002 | Gill ........................ 360/324.12 |
| 6,449,134 B1 | 9/2002 | Beach et al. |
| 6,473,279 B2 | 10/2002 | Smith et al. |
| 6,643,915 B2 | 11/2003 | Gill |
| 6,671,139 B2 | 12/2003 | Carey et al. |
| 6,704,175 B2 | 3/2004 | Li et al. |
| 6,967,825 B2 * | 11/2005 | Gill ........................ 360/324.12 |

(Continued)

OTHER PUBLICATIONS

"Priorartdatabase.com", "Self-Pinned Dual with AP-Coupled Free Layer", Oct. 24, 2002.

*Primary Examiner*—Allen Cao
(74) *Attorney, Agent, or Firm*—John J. Oskorep, Esq.; Matthew Zisas

(57) ABSTRACT

Current-perpendicular-to-the-plane (CPP), current-in-to-the-plane (CIP), and tunnel valve type sensors are provided having an antiparallel (AP) coupled free layer structure, an in-stack biasing structure which stabilizes the AP coupled free layer structure and a nonmagnetic spacer layer formed between the in-stack biasing layer and the AP coupled free layer structure. The AP coupled free layer structure has a first AP coupled free layer adjacent to the nonmagnetic spacer layer, a second AP coupled free layer, and an antiparallel coupling (APC) layer formed between the first and the second AP coupled free layers. The net moment of the AP coupled free layer structure has an antiparallel edge magnetostatic coupling with the in-stack biasing structure. At the same time, the first AP coupled free layer has an antiparallel exchange coupling with the second AP coupled free layer. By forming the second AP coupled free layer with a thickness greater than a thickness of the first AP coupled free layer, the AP coupled free layer structure has a net magnetic moment in the direction of the second AP coupled free layer moment. The non-magnetic spacer layer is chosen so that first AP coupled free layer has a parallel interlayer (Neel or Orange-peel or positive exchange) coupling with the in-stack biasing structure, so that the interlayer coupling adds to the edge magnetostatic coupling to increase a stability of the AP coupled free layer structure.

39 Claims, 5 Drawing Sheets

U.S. PATENT DOCUMENTS

| | | |
|---|---|---|
| 6,985,338 B2 * | 1/2006 | Gill ................. 360/324.12 |
| 7,075,760 B2 * | 7/2006 | Gill ................. 360/324.12 |
| 2001/0028537 A1 | 10/2001 | Gill |
| 2002/0067577 A1 * | 6/2002 | Beach et al. ............ 360/314 |
| 2002/0141120 A1 | 10/2002 | Gill |
| 2002/0159201 A1 | 10/2002 | Li et al. |
| 2002/0163765 A1 * | 11/2002 | Gill ................. 360/324.11 |
| 2003/0179513 A1 | 9/2003 | Pinarbasi |
| 2003/0227722 A1 * | 12/2003 | Freitag et al. ....... 360/324.11 |
| 2003/0235016 A1 | 12/2003 | Gill |
| 2004/0006454 A1 * | 1/2004 | Gill ................. 360/324.12 |
| 2004/0075953 A1 * | 4/2004 | Gill ..................... 360/314 |

* cited by examiner

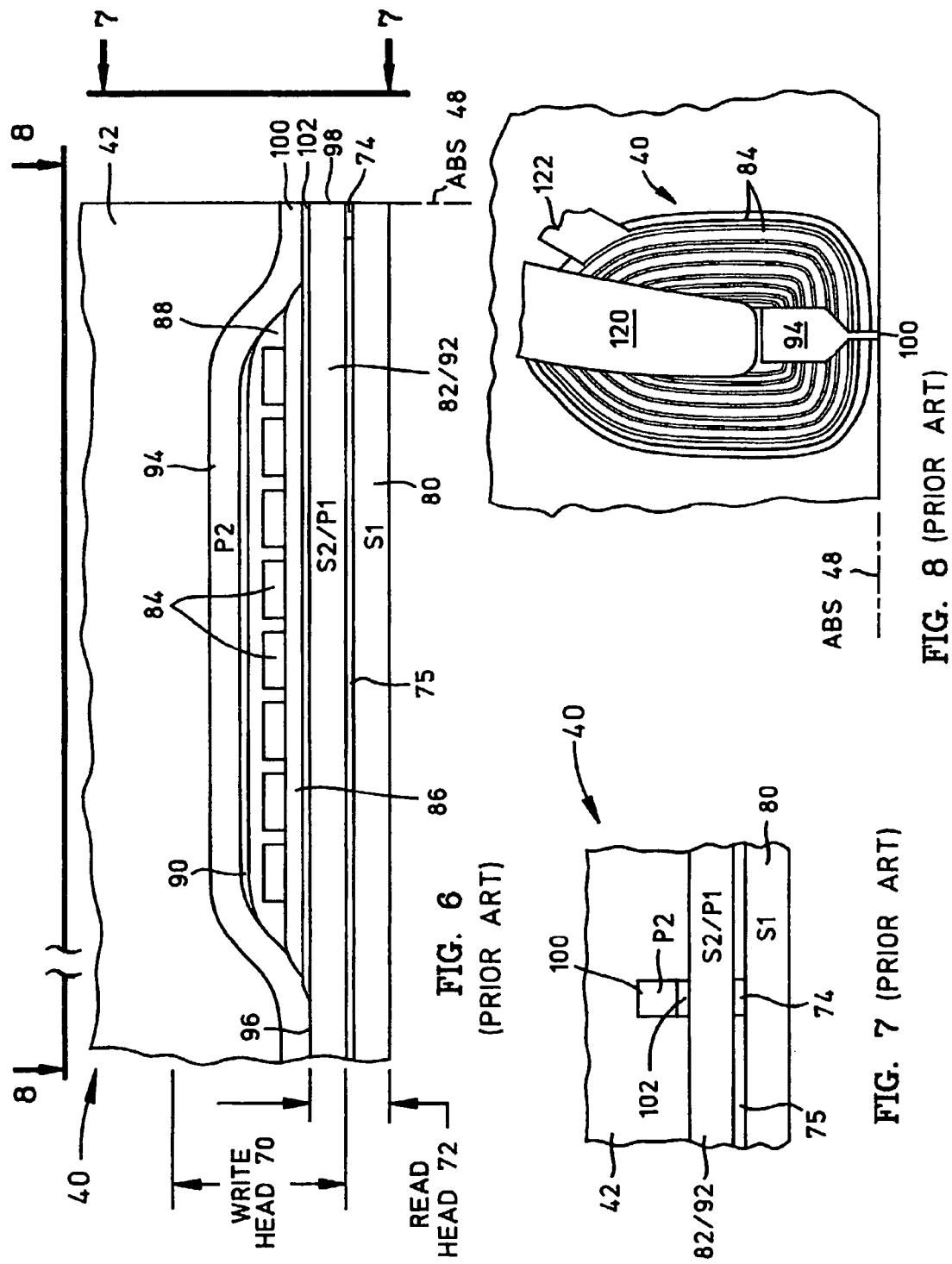

READ SENSOR HAVING AN IN-STACK BIASING STRUCTURE AND AN AP COUPLED FREE LAYER STRUCTURE FOR INCREASED MAGNETIC STABILITY

BACKGROUND

1. Field of the Technology

The present application relates generally to read sensors of magnetic heads in data storage devices, and more particularly to current-perpendicular-to-the-plane (CPP), current-in-to-the-plane (CIP) or tunnel valve type sensors, which have an AP coupled free layer structure, an in-stack biasing structure which stabilizes the AP coupled free layer structure, and a nonmagnetic spacer layer formed between the in-stack biasing structure and the AP coupled free layer structure.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads which include read sensors are then used to read data from the tracks on the disk surfaces.

In high capacity disk drives, magnetoresistive (MR) read sensors, commonly referred to as MR heads, may be used to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage. Within the general category of MR sensors is the giant magnetoresistance (GMR) sensor manifesting the GMR effect. In GMR sensors, the resistance of the MR sensing layer varies as a function of the spin-dependent transmission of the conduction electrons between magnetic layers separated by a nonmagnetic layer (spacer) and the accompanying spin-dependent scattering which takes place at the interface of the magnetic and nonmagnetic layers and within the magnetic layers. GMR sensors using only two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect.

One of the ferromagnetic (FM) layers referred to as the pinned layer has its magnetization typically pinned by exchange coupling with an antiferromagnetic (AFM) layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other FM layer referred to as the free layer, however, is not fixed and is free to rotate in response to the field from the information recorded on the magnetic medium (the signal field). The pinned layer may be part of an AP pinned structure which includes an APC layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer.

An alternative to the single-layer configuration of the free layer is that of an antiparallel (AP) coupled free layer structure having a first AP coupled free layer, a second AP coupled free layer and an antiparallel coupling (APC) layer formed between the first and the second AP coupled free layers.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or AP pinned depending upon whether the pinned structure is one or more FM layers with a unidirectional magnetic moment or a pair of AP pinned layers separated by the APC layer with magnetic moments of the AP pinned layers being antiparallel. Sensors are still further classified as single or dual wherein a single sensor employs only one pinned layer and a dual sensor employs two pinned layers with the free layer structure located therebetween.

A read sensor may also be of a current-perpendicular-to-the-planes (CPP) type in which current flows perpendicular to the major planes of the sensor layers. First and second shield layers engage the bottom and the top, respectively, of the sensor so as to simultaneously serve as electrically conductive leads for the sensor. The CPP sensor may be contrasted with a current-in-parallel-to-the-planes (CIP) type sensor in which the current is conducted in planes parallel to the major thin film planes of the sensor. In a CPP sensor, when the spacer layer between the free layer and the AP pinned structure is nonmagnetic and electrically conductive (such as copper), the current is referred to as a "sense current"; however when the spacer layer is nonmagnetic and electrically nonconductive (such as aluminum oxide), the current is referred to as a "tunneling current". Hereinafter, the current is referred to as a perpendicular current $I_p$ which can be either a sense current or a tunneling current.

A specific type of CPP read sensor is a tunnel valve type sensor comprising two ferromagnetic layers separated by a thin, electrically insulating tunnel barrier layer. In the tunnel valve type sensor, one ferromagnetic layer has its magnetic moment pinned and the other ferromagnetic layer has its magnetic moment free to rotate in response to perpendicular current $I_p$.

When the magnetic moments of the pinned and free layers are parallel with respect to one another the resistance of the sensor to the perpendicular current $I_p$ is at a minimum, and when their magnetic moments are antiparallel the resistance of the sensor to the perpendicular current $I_p$ is at a maximum. A change in resistance of the sensor is a function of cosine $\theta$, where $\theta$ is the angle between the magnetic moments of the pinned and free layers. When the perpendicular current $I_p$ is conducted through the sensor, resistance changes, due to field signals from the rotating magnetic disk, cause potential changes that are detected and processed as playback signals. The sensitivity of the sensor is quantified with a magnetoresistive coefficient ΔR/R, where ΔR is the change in resistance of the sensor from minimum resistance (magnetic moments of free and pinned layers parallel) to maximum resistance (magnetic moments of the free and pinned layers antiparallel) and R is the resistance of the sensor at minimum resistance.

It should be understood that a narrow track width is important for promoting the track width density of the read head. The more narrow the track width the greater the number of tracks that can be read per linear inch along a radius of the rotating magnetic disk. This enables an increase in the magnetic storage capacity of the disk drive. It should also be understood that the thinner the read gap length, the higher the linear read bit density of the read head. The read gap is the length of the sensor between the first and second shield layers. A relatively thin read gap length means that more bits can be read per inch along the track of a rotating magnetic disk which enables an increase in the storage capacity of the magnetic disk drive.

It is important that the free layer be longitudinally biased parallel to the ABS and parallel to the major planes of the thin film layers of the sensor in order to magnetically stabilize the free layer. Typically, magnetic spins of the free layer are unstable in small sensor geometries and produce magnetic noise in response to magnetic fields. Therefore, the free layer must be stabilized by longitudinal biasing so that the magnetic spins of the free layer are in a single domain configuration.

There are two stabilization schemes for longitudinal biasing of the free layer. One stabilization scheme is to provide a longitudinal biasing field from the lead regions at the side edges of the read sensor. The most common technique of the prior art includes the fabrication of tail stabilization at the physical track edges of the sensor. The efficacy of the method of stabilization depends critically on the precise details of the tail stabilization, which is difficult to accurately control using present fabrication methods.

The other stabilization scheme is to provide an in-stack biasing structure including a ferromagnetic bias layer and an AFM bias layer. FIG. 10 shows an in-stack biasing scheme for stabilizing a free layer of a spin valve of the prior art. A read sensor structure 1000 includes a free layer 1030, a pinned layer 1012 and a spacer layer 1020 located between free layer 1030 and pinned layer 1012. AFM pinning layer 1010 is formed adjacent to pinned layer 1012 and orients a magnetization 1014 of pinned layer 1012 into (or out of) the page. In-stack biasing structure 1006 includes an FM biasing layer 1044 and an AFM biasing layer 1046. MR read sensor structure 1000 also includes a nonmagnetic spacer layer 1042 disposed between free layer 1030 and in-stack biasing structure 1006. The magnetization of the FM biasing layer 1016 is pinned by exchange coupling to the AFM biasing layer 1018. For small sensor widths, the dominant interaction between the magnetization 1045 of the FM biasing layer and the magnetization 1032 of the free layer 1030 is edge magnetostatic coupling, which favors an antiparallel alignment between magnetizations 1032 and 1045.

In standard in-stack biasing schemes, in addition to the edge magnetostatic coupling, there will be interlayer coupling between the in-stack biasing structure and the free layer across the nonmagnetic spacer layer 1042 which is either magnetostatic (Neel or orange peel coupling) or exchange coupling (only if the spacer layer 1042 is conducting). In the case of Neel coupling, coupling characteristics can be accurately controlled over a wide range of values by changing the thickness of the nonmagnetic spacer 1042. Unfortunately, Neel coupling favors a parallel orientation between the magnetization of the layers and therefore undermines the effectiveness of the in-stack biasing structure. In the case of exchange coupling, the coupling characteristics are much more difficult to control because they are highly sensitive to the thickness of the spacer layer 1042 and may favor either a parallel orientation (decreasing the effectiveness of the in-stack bias structure) or an antiparallel orientation (increasing the effectiveness of the in-stack biasing structure). To increase the effectiveness of the magnetostatic stabilization from the in-stack biasing, it is desirable to achieve a small magnetic moment for the free layer which is directly dependent on its thickness. However, with current high density storage requirements, it is difficult to achieve a low thickness for the free layer without rendering it inoperative.

Accordingly, there is an existing need to overcome these and other deficiencies of the prior art.

SUMMARY

A magnetic head includes first and second shield layers and a read sensor formed between and in electrical contact with the first and second shield layers, where the read sensor is of the current-perpendicular-to-the-plane (CPP), current-in-to-the-plane (CIP) or tunnel valve type sensor. The read sensor includes an antiparallel (AP) coupled free layer structure, an in-stack biasing structure which stabilizes the AP coupled free layer structure and a nonmagnetic spacer layer formed between the in-stack biasing layer and the AP coupled free layer structure. The AP coupled free layer structure comprises a first AP coupled free layer adjacent to the nonmagnetic spacer layer, a second AP coupled free layer and an antiparallel coupling (APC) layer formed between the first and the second AP coupled free layers.

The net magnetic moment of the AP coupled free layer structure has an antiparallel edge magnetostatic coupling with the net magnetic moment of the in-stack biasing structure. At the same time, the first AP coupled free layer has an antiparallel exchange coupling with the second AP coupled free layer. By forming the second AP coupled free layer with a thickness greater than a thickness of the first AP coupled free layer, the AP coupled free layer structure has a net magnetic moment in the direction of the second AP coupled free layer moment. The non-magnetic spacer layer is chosen so that first AP coupled free layer has a parallel interlayer (Neel or Orange-peel or positive exchange) coupling with the in-stack biasing structure, so that the interlayer coupling adds to the edge magnetostatic coupling to thereby increase the stability of the AP coupled free layer structure.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6-6 of FIG. 2;

FIG. 7 is a partial ABS view of the slider taken along plane 7-7 of FIG. 6 to show the read and write elements of the magnetic head;

FIG. 8 is a view taken along plane 8-8 of FIG. 6 with all material above the coil layer and leads removed;

DETAILED DESCRIPTION OF THE PREFERRED EMBODIMENTS

A magnetic head includes first and second shield layers and a read sensor formed between and in electrical contact with the first and second shield layers, where the read sensor is of the current-perpendicular-to-the-plane (CPP), current-in-to-the-plane (CIP) or tunnel valve type sensor. The read sensor includes an antiparallel (AP) coupled free layer structure, an in-stack biasing structure which stabilizes the AP coupled free layer structure and a nonmagnetic spacer layer formed between the in-stack biasing layer and the AP coupled free layer structure. The AP coupled free layer structure comprises a first AP coupled free layer adjacent to the nonmagnetic spacer layer, a second AP coupled free layer and an antiparallel coupling (APC) layer formed between the first and the second AP coupled free layers. The net moment of the AP coupled free layer structure has an antiparallel edge magnetostatic coupling with the in-stack biasing structure. At the same time the first AP coupled free layer has an antiparallel exchange coupling with the second AP coupled free layer. By forming the second AP coupled free layer with a thickness greater than a thickness of the first AP coupled free layer, the AP coupled free layer structure has a net magnetic moment in the direction of the second AP coupled free layer moment. The non-magnetic spacer layer is chosen so that first AP coupled free layer has a parallel interlayer (Neel or Orange-peel or positive exchange) coupling with the in-stack biasing structure, so that the interlayer coupling adds to the edge magnetostatic coupling to thereby increase a stability of the AP coupled free layer structure. By forming the second AP coupled free layer with a thickness greater than a thickness of the first AP coupled free layer, the magnetoresistive output of the sensor is also improved.

Figure 1:
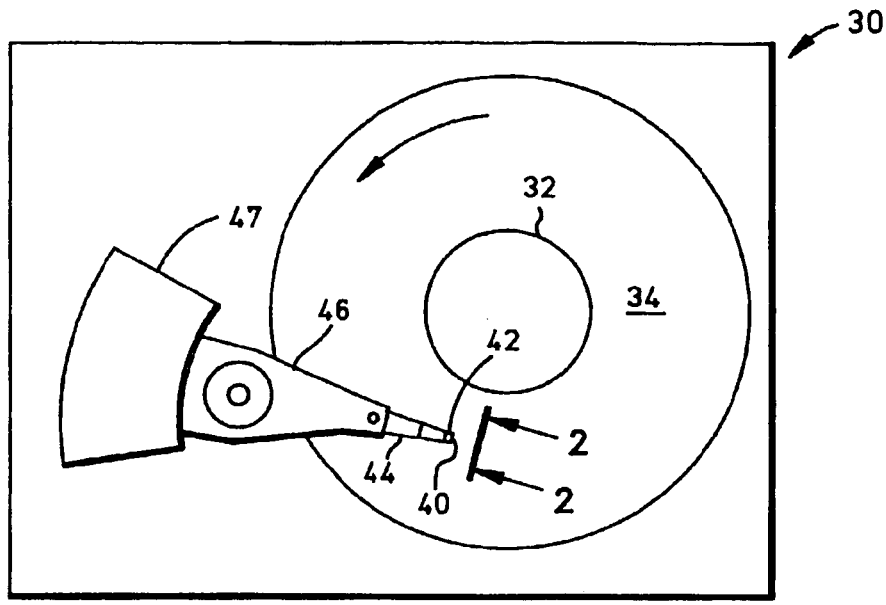
FIG. 1 is a plan view of an exemplary prior art magnetic disk drive.
Figure 2:
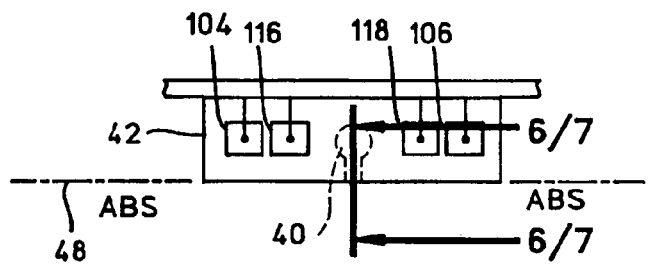
FIG. 2 is an end view of a slider with a magnetic head of the disk drive as seen in plane 2-2 of FIG. 1.
Figure 3:
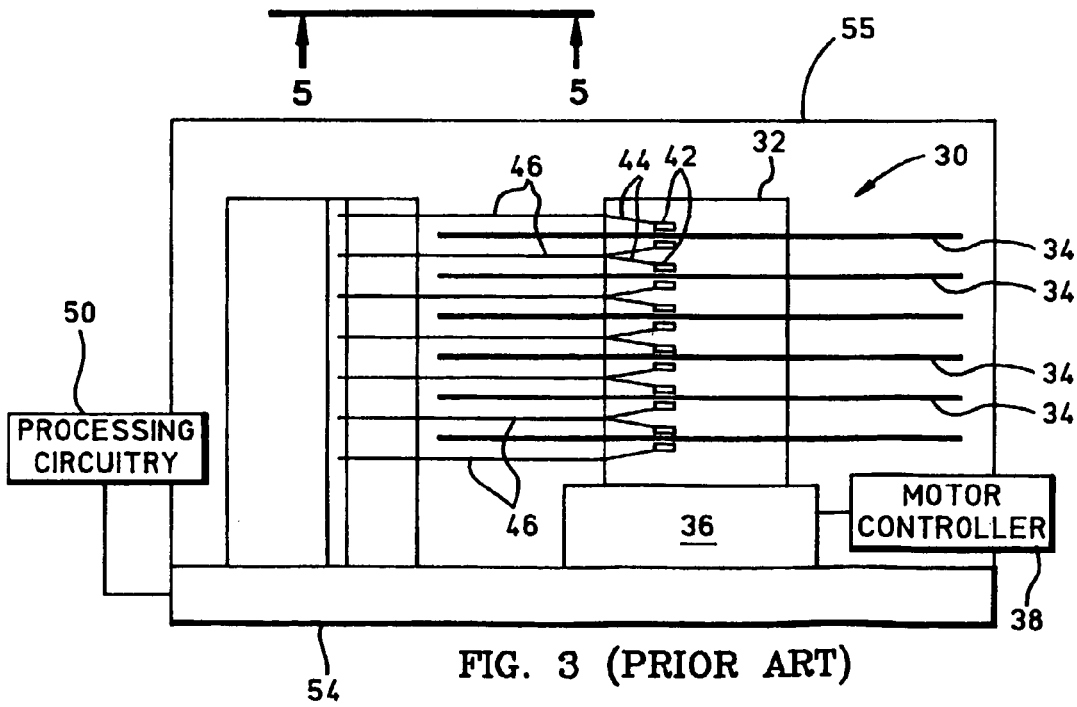
FIG. 3 is an elevation view of the magnetic disk drive wherein multiple disks and magnetic heads are employed.
Figure 4:
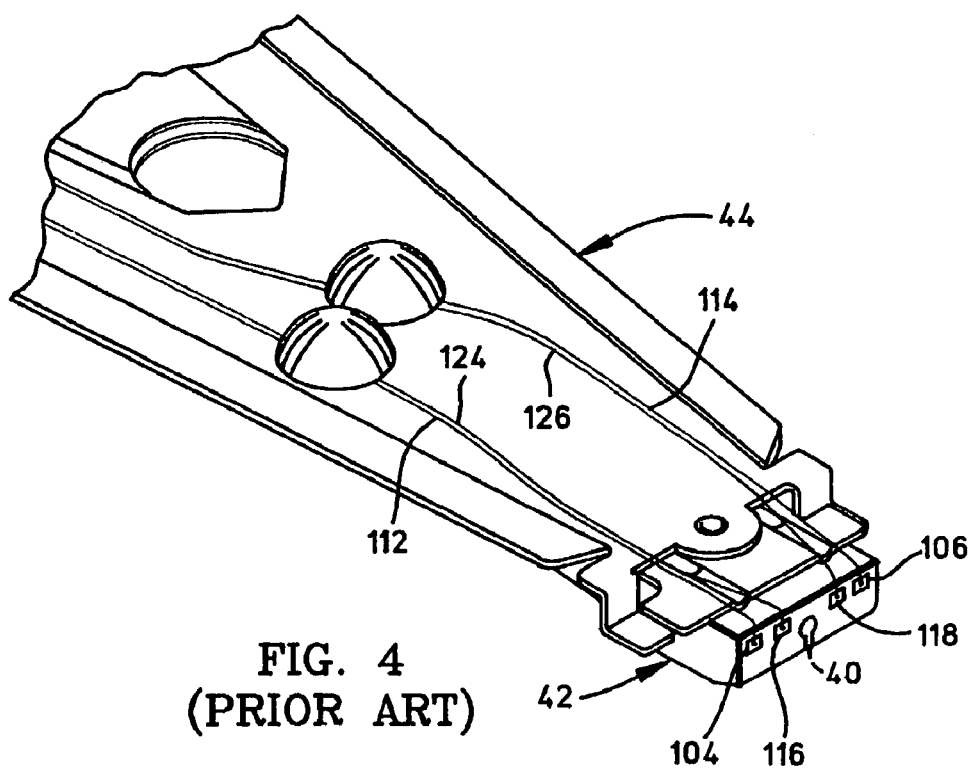
FIG. 4 is an isometric illustration of an exemplary prior art suspension system for supporting the slider and magnetic head.

Referring now to the drawings wherein like reference numerals designate like or similar parts throughout the several views, FIGS. 1-3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
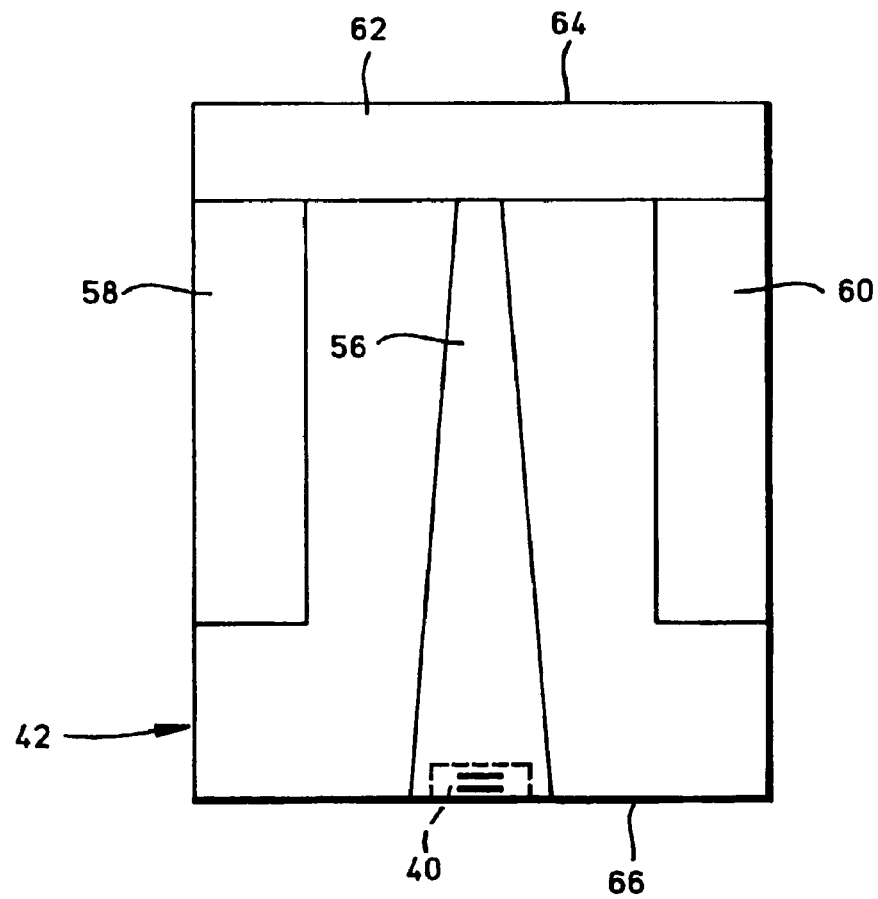
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a CPP sensor 74. FIG. 7 is an ABS view of FIG. 6. The CPP sensor 74 is sandwiched between an insulation layer 75 and ferromagnetic first and second shield layers 80 and 82 which may serve as first and second leads connected to the processing circuitry 50 in FIG. 3 for conducting a perpendicular current $I_p$ through the sensor perpendicular to major planes of the layers of the sensor. In response to external magnetic fields, the resistance of the sensor 74 changes. When the current $I_p$ is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
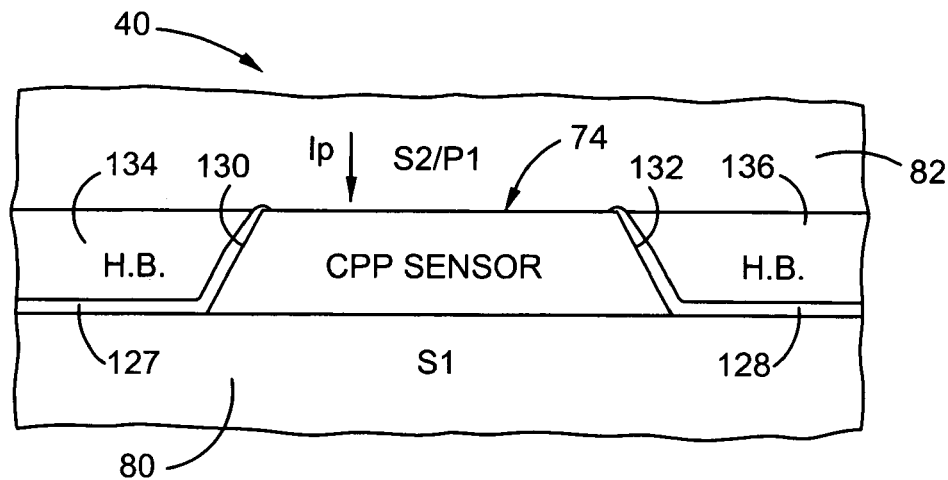
FIG. 9 is an enlarged isometric ABS illustration of a magnetic head having a current-perpendicular-to-the-planes (CPP) type sensor.

FIG. 9 is an enlarged isometric ABS illustration of the prior art read head portion shown in FIG. 7. The read head includes the CPP sensor 74. First and second insulation layers 127 and 128, such as alumina, cover the first shield layer 80 on each side of the sensor 74 as well as slightly covering first and second side walls 130 and 132 of the sensor. First and second biasing layers 134 and 136 are on the insulation layers 127 and 128 and are adjacent the side walls 130 and 132. The biasing layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the perpendicular current $I_p$ through the sensor 74.

Figure 11:
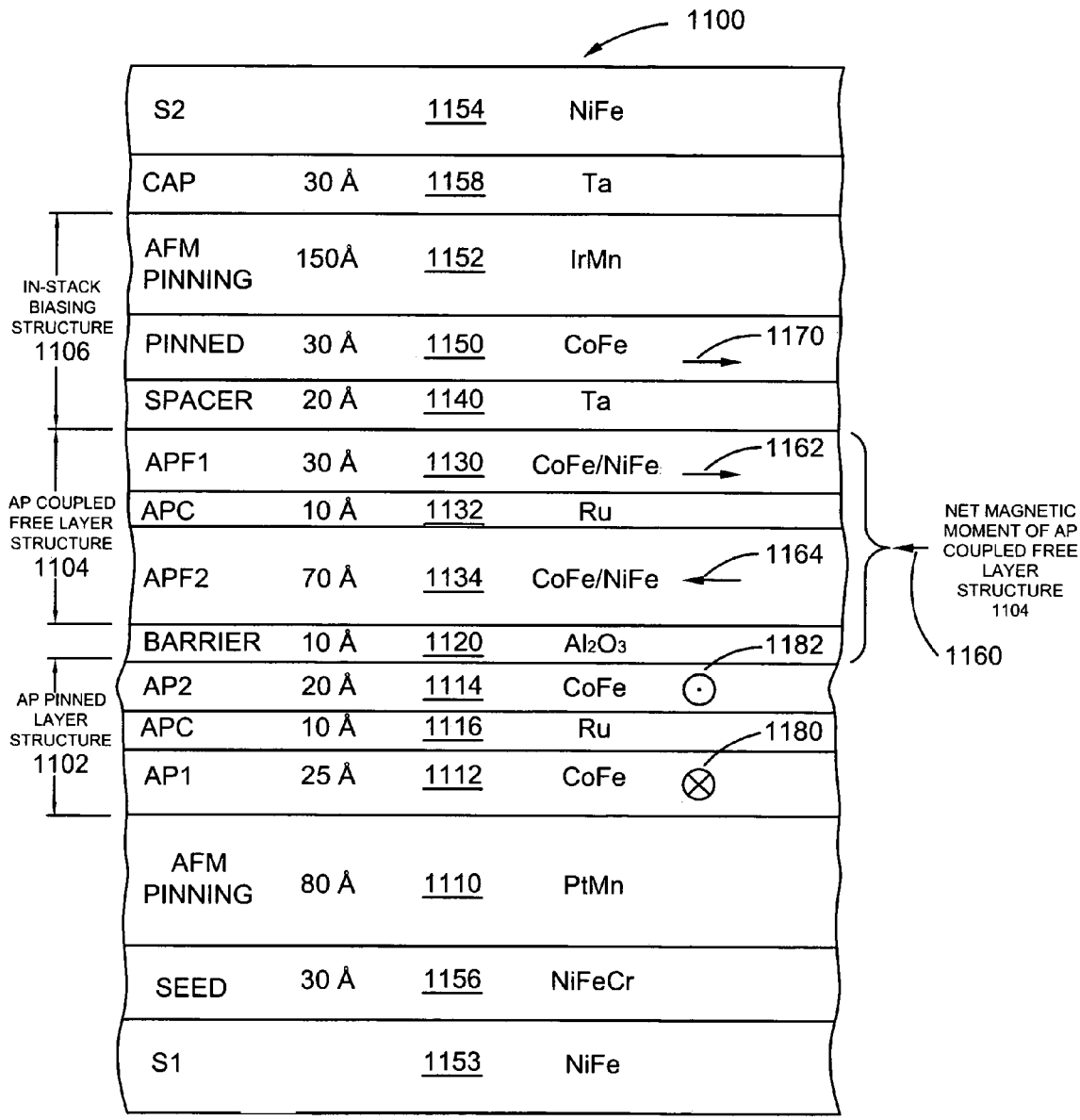
FIG. 11 is a partial close-up ABS view of the preferred embodiment of the present application.

FIG. 11 is a partial close-up ABS view of a read element of the magnetic head according to the present application. This read element may be utilized in the slider and disk drive shown and described above in relation to FIGS. 1-8. The read element includes a read sensor structure 1100 which is formed between and in contact with lower and upper shield layers 1153 and 1154. Read sensor structure 1100 is primarily formed in a central region, in between left and right side regions which are located adjacent the central region.

Read sensor structure 1100 includes, from bottom to top, a seed layer structure 1156, an antiferromagnetic (AFM) pinning layer 1110, an AP pinned layer structure 1102, an insulating tunnel barrier layer 1120, an AP coupled free layer structure 1104, an in-stack biasing structure 1106, and a cap layer 1158. In-stack biasing structure 1106 is formed underneath the cap layer and over and adjacent nonmagnetic material spacer layer 1140. AP coupled free layer structure 1104 is formed underneath nonmagnetic material spacer layer 1140 and over and adjacent insulating tunnel barrier layer 1120. AP pinned layer structure 1102 is formed beneath insulating tunnel barrier layer 1120 and over and adjacent AFM pinning layer 1110. AFM pinning layer 1110 is formed beneath pinned layer structure 1102 and over and adjacent to seed layer structure 1156. Seed layer structure 1156 is formed over lower shield layer 1153 and underneath AFM pinning layer 1110 for promoting an improved texture of the layers deposited thereon. Cap layer 1158, in-stack biasing structure 1106, AP coupled free layer structure 1104, tunnel barrier layer 1120, AP pinned layer structure 1102, AFM pinning layer 1110 and seed layer structure 1156 are formed only in the central region and do not extend within the side regions.

The read element in FIG. 11 is preferably a tunnel valve type sensor. However, the read element may be a CPP or a CIP type sensor where insulating tunnel barrier layer 1120 would be replaced with a non-magnetic spacer layer. In the case of tunnel valve or CPP GMR sensors, lower and upper shield layers 1153 and 1154 serve as electrically conductive leads for read sensor structure 1100. A perpendicular current $I_p$ is generated which flows from upper shield layer 1154 to lower shield layer 1153 through read sensor structure 1100 in a direction that is perpendicular to the planes defined by the sensor layers. In the case of a CIP sensor, the sensor structure is electrically insulated from the lower and upper shield layers 1153 and 1154 by an additional insulating layer, and the current flows parallel to the plane of the layers. In the case of a CIP sensor, the non-magnetic spacer layer 1140 may be electrically insulating.

Figure 10:
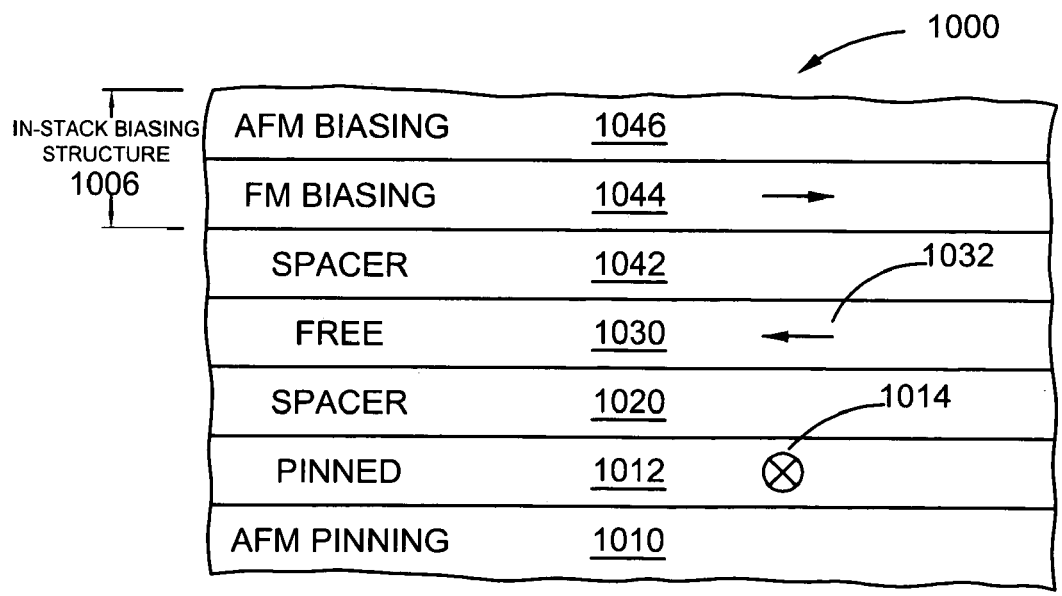
FIG. 10 is a partial close-up ABS view of a current-in-to-the-planes (CIP) type sensor of a magnetic head according to the prior art having an in-stack biasing structure.

AP pinned layer structure 1102 includes an antiparallel coupling (APC) layer 1116 which is located between first and second ferromagnetic AP pinned layers (AP1) and (AP2) 1112 and 1114. First AP pinned layer 1112 is exchange coupled to AFM pinning layer 1110 which pins a magnetic moment 1180 of first AP pinned layer 1112 perpendicular to the ABS in a direction out of or into read sensor structure 1100, as shown in FIG. 10. AFM pinning layer 1110 is formed in the central region of read sensor structure 1100. By strong antiparallel coupling between first and second AP pinned layers 1112 and 1114, a magnetic moment 1182 of second AP pinned layer 1114 is antiparallel to magnetic moment 1180. Alternatively, AP pinned structure 1102 could include a single pinned layer in contrast to the multi-layered structure of the present embodiment of the application.

Alternatively, an AP self-pinned structure is employed in contrast to the AP pinned structure. Note that no AFM pinning layer in FIG. 10 would be necessary for pinning the AP self-pinned structure in this alternative embodiment. A self-pinned read sensor of the present application relies on magnetostriction of the AP self-pinned structure as well as ABS stress for a self-pinning effect. An AFM pinning layer, which is typically as thick as 150 Angstroms, would not be necessary for pinning and therefore a relatively thin sensor could be fabricated.

AP coupled free layer structure 1104 comprises a first AP coupled free layer (APF1) 1130 adjacent nonmagnetic spacer layer 1140, a second AP coupled free layer (APF2) 1134 and an antiparallel coupling (APC) layer formed between first and second AP coupled free layers 1130 and 1134. Second AP coupled free layer 1134 has a magnetic moment 1164 which is parallel to the ABS in a direction from left to right as shown in FIG. 11. First AP coupled free layer 1130 has a magnetic moment 1162 which is antiparallel to the magnetic moment 1164 by a strong antiparallel coupling therebetween. Second AP coupled free layer 1134 has a thickness greater than a thickness of first AP coupled free layer 1130. As such, second AP coupled free layer 1134 has a higher magnetic moment than first AP coupled free layer 1130, so that magnetic moment 1164 is controlling when responding to signal fields from a rotating magnetic disk. Thus, AP coupled free layer structure 1104 has a net magnetic moment 1160 which is parallel to the ABS and parallel to the major planes of the sensor, in a direction from right to left as shown in FIG. 11. Net magnetic moment 1160 is quantified as the difference between the thicknesses of second AP coupled free layer 1134 and first AP coupled free layer 1130.

In-stack biasing structure 1106 includes an AFM pinning layer 1152, a ferromagnetic (FM) pinned layer 1150, and a nonmagnetic spacer layer 1140. In-stack biasing structure 1106 is located in the central region within the track width for stabilizing AP coupled free layer structure 1134. AFM pinning layer 1152 interfaces and is exchange coupled to FM pinned layer 1150 for pinning a magnetic moment 1170 of FM pinned layer 1150 parallel to the ABS and parallel to the planes of the layers of the sensor as indicated. Spacer layer 1140 causes FM pinned layer 1150 and AP coupled free layer structure 1104 to be physically separated but in close proximity to each other. When the sensor structure is formed by lithography to submicrometer trackwidth, the net magnetic moments of structure 1104 and structure 1106 become magnetostatically coupled to each other so that an antiparallel arrangements of the moments if preferred, which stabilizes the net magnetic moment 1160 of AP coupled free layer structure 1104 parallel to the ABS and parallel to the major planes of the sensor as indicated. This biasing is uniform from the sides of AP coupled free layer structure 1104 so that the biasing does not cause a limitation on narrow track width sensors. The nonmagnetic spacer layer has a preferred thickness in the range of 5-50 Å suitable to increase the parallel ferromagnetic coupling of the first AP coupled free layer with the in-stack biasing structure, and preferably comprises copper (Cu), ruthenium (Ru), rhodium (Rh), tantalum (Ta), or titanium (Ti). As shown in FIG. 10, first AP coupled free layer 1130 has a parallel (Neel or Orange-peel or positive exchange) coupling with in-stack biasing structure 1106 so that moment 1162 and 1170 preferably lie in the same direction from left to right in FIG. 11.

Exemplary thicknesses and materials of the layers for the preferred embodiment of the present application sensor are shown in FIG. 11. Further note that seed layer structure 1156 may alternatively be a multi-layer seed layer structure. Also note that nonmagnetic spacer layer 1140 of in-stack biasing structure 1106 may alternatively be ruthenium (Ru), copper (Cu), a bilayer of tantalum/ruthenium (Ta/Ru), or tantalum/copper (Ta/Cu) instead of tantalum (Ta). Note that layer 1120 between AP pinned layer structure 1102 and AP coupled free layer structure 1104 may be either aluminum-oxide ($Al_2O_3$) for the preferred embodiment or copper (Cu). When tunnel barrier layer 1120 is aluminum-oxide ($Al_2O_3$) (or even magnesium-oxide (MgO)), the sensor may be employed as a tunneling CPP sensor; when tunnel barrier layer 1120 is substituted for a non-magnetic spacer layer and is copper (Cu), the sensor may be employed as a CPP or a CIP spin valve sensor. The invention is applicable to either type of these three sensors. If the sensor is a CPP or a CIP spin valve sensor, the following additional materials may be substituted for the materials shown in FIG. 11: pinned layer 1150 may be iron (Fe) or cobalt (Co) instead of cobalt-iron (CoFe); non-magnetic spacer layer 1140 may be chromium (Cr) instead of ruthenium (Ru); first AP coupled free layer 1130 may be iron (Fe) or cobalt (Co) singularly or cobalt-iron/nickel-iron (CoFe/NiFe) instead of cobalt-iron (CoFe); second AP coupled free layer 1134 may also be iron (Fe) singularly or cobalt-iron/nickel-iron (CoFe/NiFe) instead of cobalt-iron (CoFe); and APC layer 1116 may be chromium (Cr) instead of ruthenium (Ru). It should be understood that either of these three sensors may be a top-type sensor instead of a bottom-type sensor as shown. In a top-type CPP sensor, the layers shown in FIG. 11 are inverted except for the cap layer and the seed layer structure. Further, either of the three sensors may be employed in the read head 40 shown in FIG. 6 and the magnetic disk drive shown in FIG. 3.

Methods of making of such a read sensor will now be described, with reference to the sensor shown and described in relation to FIG. 11. To begin, a lower shield layer which will also serve as a first electrically conducting lead for the sensor is formed on a surface of a wafer. A plurality of read sensor layers are then deposited in full film over the lower shield/lead layer. The plurality of read sensors layers deposited include, from bottom to top, a seed layer structure, an AP pinned layer structure, a tunnel barrier or non-magnetic spacer layer, an AP coupled free layer structure, an in-stack biasing structure, and a cap layer. Next, a central resist is formed over the read sensor layers in the central region. With the central resist in place, ion milling is performed such that read sensor materials are removed in the side regions. The ion milling is performed until the first AP self-pinned layer of the AP self-pinned structure is reached, when the ion milling is stopped. From the ion milling, a central read sensor structure is formed underneath the central resist. With the central resist still in place, insulator materials are deposited over the structure such that insulator layers are formed in the side regions adjacent the central read structure. A planarization process such as a chemical-mechanical polishing (CMP) may be used to planarize the top surface of the central read sensor and the insulator layers. Finally, an upper shield layer which will also serve as a second electrically conducting lead for the sensor is then formed over the planarized top surface of the structure. The resulting structure is partially shown in FIG. 10.

Final Comments. As described herein, a magnetic head includes first and second shield layers and a read sensor formed between and in electrical contact with the first and second shield layers, where the read sensor is of the current-perpendicular-to-the-plane (CPP), current-in-to-the-plane (CIP) or a tunnel valve type sensor. The read sensor includes an AP coupled free layer structure, an antiparallel (AP) pinned layer structure which includes a first AP pinned layer, a second AP pinned layer, and an AP coupling (APC) layer formed between the first and the second AP pinned layers; and a tunnel barrier layer formed between the AP coupled free layer structure and the AP pinned layer structure. The AP coupled free layer structure comprises a first AP coupled free layer adjacent to the nonmagnetic spacer layer, a second AP coupled free layer and an antiparallel coupling (APC) layer formed between the first and the second AP coupled free layers. The net moment of the AP coupled free layer structure has an antiparallel edge magnetostatic coupling with the in-stack biasing structure. At the same time, the first AP coupled free layer has an antiparallel exchange coupling with the second AP coupled free layer. By forming the second AP coupled free layer with a thickness greater than a thickness of the first AP coupled free layer, the AP coupled free layer structure has a net magnetic moment in the direction of the second AP coupled free layer moment. The non-magnetic spacer layer is chosen so that first AP coupled free layer has a parallel interlayer (Neel or Orange-peel or positive exchange) coupling with the in-stack biasing structure, so that the interlayer coupling adds to the edge magnetostatic coupling to thereby increase the stability of the AP coupled free layer structure. The in-stack biasing structure includes an antiferromagnetic (AFM) pinning layer; a pinned layer formed adjacent the AFM pinning layer; and a spacer layer formed between the pinned layer and the AP coupled free layer structure.

A disk drive of the present application includes a housing; a magnetic disk rotatably supported in the housing; a magnetic head; a support mounted in the housing for supporting the magnetic head so as to be in a transducing relationship with the magnetic disk; a spindle motor for rotating the magnetic disk; an actuator connected to the support for moving the magnetic head to multiple positions with respect to said magnetic disk; a processor connected to the magnetic head, to the spindle motor, and to the actuator for exchanging signals with the magnetic head for controlling movement of the magnetic disk and for controlling the position of the magnetic head; the magnetic head including first and second shield layers; a read sensor formed in between and in electrical contact with the first and the second shield layers which also serve as electrically conductive leads for the read sensor; the read sensor including an in-stack biasing structure; an AP coupled free layer structure; an AP pinned layer structure; and a tunnel barrier layer formed between the AP coupled free layer structure and the AP pinned layer structure. Again, the AP coupled free layer structure comprises a first AP coupled free layer adjacent to the nonmagnetic spacer layer, a second AP coupled free layer and an antiparallel coupling (APC) layer formed between the first and the second AP coupled free layers. The net moment of the AP coupled free layer structure has an antiparallel edge magnetostatic coupling with the in-stack biasing structure. At the same time, the first AP coupled free layer has an antiparallel exchange coupling with the second AP coupled free layer. By forming the second AP coupled free layer with a thickness greater than a thickness of the first AP coupled free layer, the AP coupled free layer structure has a net magnetic moment in the direction of the second AP coupled free layer moment. The non-magnetic spacer layer is chosen so that first AP coupled free layer has a parallel interlayer (Neel or Orange-peel or positive exchange) coupling with the in-stack biasing structure, so that the interlayer coupling adds to the edge magnetostatic coupling to thereby increase a stability of the AP coupled free layer structure. The in-stack biasing structure includes an antiferromagnetic (AFM) pinning layer; a pinned layer formed adjacent the AFM pinning layer; and a spacer layer formed between the pinned layer and the AP coupled free layer structure.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A read sensor, comprising:
    an antiparallel (AP) coupled free layer structure;
    an in-stack biasing structure which stabilizes the AP coupled free layer structure;
    a non-magnetic spacer layer between the in-stack biasing structure and the AP coupled free layer structure;
    the AP coupled free layer structure having an antiparallel magnetostatic edge coupling with the in-stack biasing layer and comprising:
        a first AP coupled free layer
        a second AP coupled free layer;
        an antiparallel coupling layer formed between the first and the second AP free layers;
        the first AP coupled free layer being adjacent and in closer proximity to the non-magnetic spacer layer than the second AP coupled free layer; and
        the first AP coupled free layer having a parallel magnetic coupling with the in-stack biasing structure.

2. The read sensor of claim 1, further comprising:
    the first AP coupled free layer having an antiparallel exchange coupling with the second AP coupled free layer;
    the second AP coupled free layer having a thickness greater than a thickness of the first AP coupled free layer; and
    the AP coupled free layer structure having a net magnetic moment in the direction of the second AP coupled free layer.

3. The read sensor of claim 1, wherein the read sensor comprises one of a current-perpendicular-to-the-plane (CPP), a current-in-to-the-plane (CIP), and a tunnel valve type sensor.

4. The read sensor of claim 1, wherein the in-stack biasing structure comprises at least one of NiFe, CoFe, PtMn, and IrMn.

5. The read sensor of claim 1, wherein the first AP coupled free layer and the second AP coupled free layer comprise one of nickel-iron (Ni—Fe), cobalt-iron (Co—Fe), and cobalt-iron/nickel-iron (CoFe/NiFe).

6. The read sensor of claim 1, wherein the antiparallel coupling layer comprises one of ruthenium (Ru), chromium (Cr), and iridium (Ir).

7. The read sensor of claim 1, wherein the AP coupled free layer structure has a net magnetic moment which is determined based on a difference in thicknesses of the first and the second AP coupled free layers, the net magnetic moment being antiparallel to a magnetic moment of the in-stack biasing structure.

8. The read sensor of claim 1, wherein the first AP coupled free layer has an antiparallel exchange coupling with the second AP coupled free layer.

9. The read sensor of claim 1, wherein the second AP coupled free layer has a thickness greater than a thickness of the first AP coupled free layer.

10. The read sensor of claim 1, wherein the AP coupled free layer structure having a net magnetic moment in the direction of the second AP coupled free layer.

11. The read sensor of claim 1, wherein the parallel magnetic coupling between the first AP coupled free layer and the in-stack biasing structure comprises one Neel, Orange-peel, and positive exchange coupling.

12. The read sensor of claim 1, wherein the non-magnetic spacer layer comprises one of an electrically conducting material and an insulating material.

13. The read sensor of claim 1, wherein the non-magnetic spacer layer has a thickness suitable to increase the parallel ferromagnetic coupling of the first AP coupled free layer with the in-stack biasing structure.

14. A magnetic head, comprising:
    first and second shield layers;
    a read sensor formed in between and in electrical contact with the first and the second shield layers;
    the read sensor comprising:
        an antiparallel (AP) coupled free layer structure;
        an in-stack biasing structure which stabilizes the AP coupled free layer structure;
        a non-magnetic spacer layer between the in-stack biasing structure and the AP coupled free layer structure;
        the AP coupled free layer structure having an antiparallel magnetostatic edge coupling with the in-stack biasing layer and comprising:
            a first AP coupled free layer;
            a second AP coupled free layer;
            an antiparallel coupling layer formed between the first and the second AP coupled free layers;
            the first AP coupled free layer being adjacent and in closer proximity to the non-magnetic spacer layer than the second AP coupled free layer; and
            the first AP coupled free layer having a parallel magnetic coupling with the in-stack biasing structure.

15. The magnetic head of claim 14, further comprising:
    the first AP coupled free layer having an antiparallel exchange coupling with the second AP coupled free layer;
    the second AP coupled free layer having a thickness greater than a thickness of the first AP coupled free layer; and
    the AP coupled free layer structure having a net magnetic moment in the direction of the second AP coupled free layer.

16. The magnetic head of claim 14, wherein the read sensor comprises one of a current-perpendicular-to-the-plane (CPP), a current-in-to-the-plane (CIP), and a tunnel valve type sensor.

17. The magnetic head of claim 14, wherein the in-stack biasing structure comprises at least one of CoFe, NiFe, PtMn, or IrMn.

18. The magnetic head of claim 14, wherein the first AP coupled free layer and the second AP coupled free layer comprise one of nickel-iron (NiFe), cobalt-iron (Co—Fe), and cobalt-iron/nickel-iron (CoFe/NiFe).

19. The magnetic head of claim 14, wherein the antiparallel coupling layer comprises one of ruthenium (Ru), chromium (Cr), and iridium (Ir).

20. The magnetic head of claim 14, wherein the AP coupled free layer structure has a net magnetic moment which is determined based on a difference in thicknesses of the first and the second AP coupled free layers, the net magnetic moment being antiparallel to a magnetic moment of the in-stack biasing structure.

21. The magnetic head of claim 14, wherein the first AP coupled free layer has an antiparallel exchange coupling with the second AP coupled free layer.

22. The magnetic head of claim 14, wherein the second AP coupled free layer has a thickness greater than a thickness of the first AP coupled free layer.

23. The magnetic head of claim 14, wherein the AP coupled free layer structure has a net magnetic moment in the direction of the second AP coupled free layer.

24. The magnetic head of claim 14, wherein the parallel magnetic coupling between the first AP coupled free layer and the in-stack biasing structure comprises one Neel, Orange-peel, and positive exchange coupling.

25. The magnetic head of claim 14, wherein the non-magnetic spacer layer comprises one of an electrically conducting material and an insulating material.

26. The magnetic head of claim 14, wherein the non-magnetic spacer layer has a thickness suitable to increase the parallel ferromagnetic coupling of the first AP coupled free layer with the in-stack biasing structure.

27. A disk drive, comprising:
a housing;
a magnetic head;
a support mounted in the housing for supporting the magnetic head so as to be in a transducing relationship with a magnetic disk;
a spindle motor for rotating the magnetic disk;
an actuator connected to the support for moving the magnetic head to multiple positions with respect to the magnetic disk;
a processor connected to the magnetic head, to the spindle motor, and to the actuator for exchanging signals with the magnetic head for controlling movement of the magnetic disk and for controlling the position of the magnetic head;
the magnetic head, comprising:
first and second shield layers;
a read sensor formed in between and in electrical contact with the first and the second shield layers;
the read sensor comprising:
an antiparallel (AP) coupled free layer structure;
an in-stack biasing structure which stabilizes the AP coupled free layer structure;
a non-magnetic spacer layer between the in-stack biasing structure and the AP coupled free layer structure; and
the AP free layer structure having an antiparallel magnetostatic edge coupling with the in-stack biasing layer and comprising:
a first AP coupled free layer;
a second AP coupled free layer;
an antiparallel coupling layer formed between the first and the second AP coupled free layers;
the first AP coupled free layer being adjacent and in closer proximity to the non-magnetic spacer layer than the second AP coupled free layer; and
the first AP coupled free layer having a parallel magnetic coupling with the in-stack biasing structure.

28. The disk drive of claim 27, further comprising:
the first AP coupled free layer having an antiparallel exchange coupling with the second AP coupled free layer;
the second AP coupled free layer having a thickness greater than a thickness of the first AP coupled free layer; and
the AP coupled free layer structure having a net magnetic moment in the direction of the second AP coupled free layer.

29. The disk drive of claim 27, wherein the read sensor comprises one of a current-perpendicular-to-the-plane (CPP), a current-in-to-the-plane (CIP), and a tunnel valve type sensor.

30. The disk drive of claim 27, wherein the in-stack biasing structure comprises at least one of NiFe, CoFe, IrMn, and PtMn.

31. The disk drive of claim 27, wherein the first AP coupled free layer and the second AP coupled free layer comprise one nickel-iron (Ni—Fe), cobalt-iron (Co—Fe), and cobalt-iron/nickel-iron (CoFe/NiFe).

32. The disk drive of claim 27, wherein the antiparallel coupling layer comprises one of ruthenium (Ru), chromium (Cr), and iridium (Ir).

33. The disk drive of claim 27, wherein the AP coupled free layer structure has a net magnetic moment which is determined based on a difference in thicknesses of the first and the second AP coupled free layers, the net magnetic moment being antiparallel to a magnetic moment of the in-stack biasing structure.

34. The disk drive of claim 27, wherein the first AP coupled free layer has an antiparallel exchange coupling with the second AP coupled free layer.

35. The disk drive of claim 27, wherein the second AP coupled free layer has a thickness greater than a thickness of the first AP coupled free layer.

36. The disk drive of claim 27, wherein the AP coupled free layer structure has a net magnetic moment in the direction of the second AP coupled free layer.

37. The disk drive of claim 27, wherein the parallel magnetic coupling between the first AP coupled free layer and the in-stack biasing structure comprises one Neel, Orange-peel, and positive exchange coupling.

38. The disk drive of claim 27, wherein the non-magnetic spacer layer comprises one of an electrically conducting material and an insulating material.

39. The disk drive of claim 27, wherein the non-magnetic spacer layer has a thickness suitable to increase the parallel ferromagnetic coupling of the first AP coupled free layer with the in-stack biasing structure.

* * * * *